Jan. 15, 1963    R. PAIGE    3,073,189
DRILLS
Filed Sept. 28, 1961
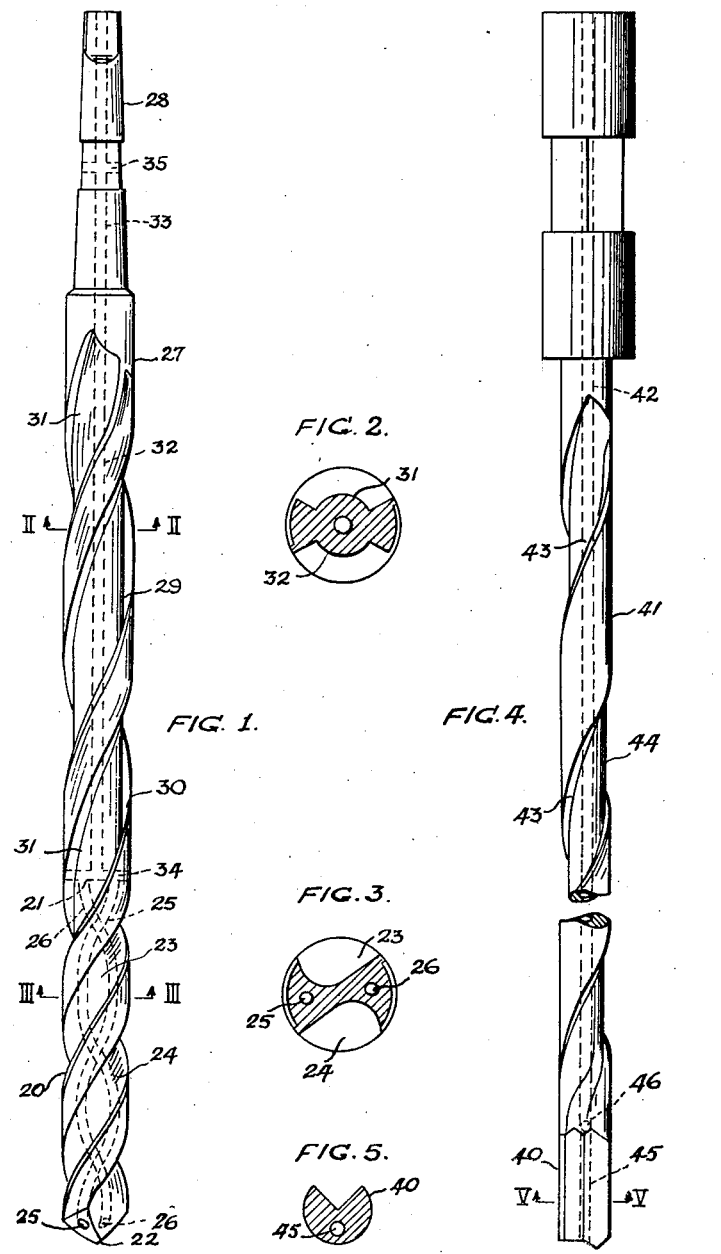

United States Patent Office 3,073,189
Patented Jan. 15, 1963

3,073,189
DRILLS
Robert Paige, Sheffield, England, assignor to The Stalker Drill Works Limited, Sheffield, England, a company of Great Britain and Northern Ireland
Filed Sept. 28, 1961, Ser. No. 141,385
Claims priority, application Great Britain Sept. 30, 1960
6 Claims. (Cl. 77—68)

This invention relates to drills having straight or helical flutes and of the kind comprised of at least two co-axial fluted lengths rigidly joined together in which one fluted end length carries the cutting point of the drill and is hereinafter termed, for the sake of convenience, as the "cutting length," and the other fluted end length, hereinafter termed, also for the sake of convenience, as the "shank-carrying length," carries a parallel or taper shank which is usually welded thereto, said cutting and shank-carrying lengths and the shank being provided with intercommunicating passages for conveying lubricant interiorly through the drill from a feed inlet in the shank to the cutting end thereof for the purpose of lubricating and cooling the drill whilst it is in operation upon a workpiece.

The lubricant-conveying passage in the shank is usually provided at the axis thereof and is made to communicate with a lubricant-conveying passage at one or each side of the axis of the fluted shank-carrying and cutting lengths of the drill by the provision of a cross port at the requisite point in the drill which effects intercommunication of an end of the lubricant-conveying passage in the shank with the adjacent end of the lubricant-conveying passage in the shank-carrying length of the drill.

The lubricant-conveying passage or passages in the fluted shank-carrying and cutting lengths is or are disposed alongside the common axis thereof since it is not possible to provide a lubricant-conveying passage at and throughout the axis of the drill as such a passage would interfere with the cutting point thereof. Where helical flutes are employed the lubricant-conveying passage or passages, therefore, follow the helices of said flutes.

In some cases, lubricant is fed into the axial lubricant-conveying passage in the shank at the outer extremity thereof, but in other cases said axial passage is suitably closed at the outer extremity of said shank and a cross port provided intermediate of the ends of the shank by which cross port the lubricant is fed into said axial passage by a suitable fluid-conveying device adapted to be fitted around the shank for the purpose.

According to the present invention, there is provided a fluted drill comprising a cutting length and a tubular shank-carrying length rigidly joined together in co-axial relation, the cutting length being provided, at its free extremity, with the cutting end of the drill and, interiorly throughout its length and alongside its axis, with a lubricant-conveying passage, and the tubular shank-carrying length being provided at its free end with a shank, the bore of said shank-carrying length and a bore in the shank together forming a lubricant-conveying passage at the common axis of the shank-carrying length and the shank, a lubricant-conveying cross port being provided in the drill at the junction of the cutting length with the shank-carrying length for intercommunicating the lubricant-conveying passages in said lengths, a flute being provided in each of said lengths of which the flute in the shank-carrying length is of shallower depth than and merges at one end into the adjoining end of the flute in the cutting length and the flute in the shank-carrying length being of a cross section having a convex surface medially of its width which convex surface is constituted by an exposed surface of the integral hollow core of said shank-carrying length, the said exposed surface of said core resulting from the presence of the flute in said shank-carrying length.

The shank of the fluted tubular shank-carrying length may be of conventional parallel or taper form and may be integral therewith or it may be preformed and suitably joined to said length.

The fluted cutting length may have one or more helical or straight flutes into which merge or merges a complementary helical or straight flute or flutes in the shank-carrying length.

The fluted shank-carrying length is formed from suitable tubing in which a flute or flutes is or are formed therein by a machining operation, for example, by a milling operation and the shank, whether formed integral therewith or separately therefrom, is also formed by a machining operation upon the tubing.

The invention will be better understood from the following description in which reference is had to the accompanying drawings.

In the drawings:
FIG. 1 is an elevation of one form of helically fluted twist drill according to this invention.
FIG. 2 is an enlarged cross section taken on the line II—II of FIG. 1.
FIG. 3 is a similar view to FIG. 2 taken on the line III—III of FIG. 1.
FIG. 4 is an elevation of an alternative form of drill which is of the type known as a gun drill.
FIG. 5 is an enlarged cross section at the line V—V of FIG. 4.

Referring to the construction of drill shown in FIGS. 1, 2 and 3, said drill comprises a preformed helically fluted cutting length 20 of high speed steel or other suitable hard steel having at one end a plane face as represented by the dotted line at 21 perpendicular to the axis of said length and its other end being provided with the usual cutting point 22, two helical flutes 23, 24, of conventional form extending from said plane face to said cutting point. Two interior lubricant-conveying passages 25, 26, extend through the cutting length one at each side the axis thereof in conventional manner.

Suitably joined to the plane face, as represented by the dotted line 21, of the cutting length 20 is a helically fluted tubular shank-carrying length 27 and tubular shank 28 integral therewith formed by suitably machining a tube of any suitable steel, there being two helical flutes 29, 30, in the shank-carrying length 27. These flutes 29, 30, in the shank-carrying length 27 merge at their ends into the adjoining ends respectively of the flutes 23, 24, in the cutting length 20 of the drill substantially at the point of joindure of the two lengths 20 and 27 of the drill.

Furthermore, the flutes 29, 30 in the shank-carrying length are of different form from the conventional flutes 23, 24 in the cutting length 20 in that they are cut so as to provide that they are each of shallower depth than the flutes 23, 24 and with a cross section having a convex surface 31 which is constituted by the exposed surface of the integral hollow core of the tubular shank-carrying length 27, the said exposed surface of said core resulting from the presence of the flutes 23, 24.

The shank-carrying length 27 and the shank 28 thereof being an integral tubular length, the common bore thereof provides aligning lubricant-conveying passages 32 and 33 at the common axis of the shank-carrying length and shank.

In order that the central lubricant-conveying passage 32 in the shank-carrying length 27 shall communicate with the two lubricant-conveying passages 25, 26 in the cutting length 20, a cross port 34 is drilled across the joint of the two lengths 20 and 27 and its opposite ends suitably closed.

For the feed of lubricant into the lubricant-conveying passages 32 and 33 of the shank-carrying length 27 and shank 28 thereon, an inlet port 35 is provided in said shank transversely thereof around which a conventional form of lubricant feeding device is adapted to be mounted, the outer end of the lubricant-conveying passage 33 in the shank being suitably closed.

Although the shank 28 is shown as forming an integral part of the tubular shank-carrying length 27 it is to be understood that said shank may be preformed either as a tubular shank or as a solid piece suitably bored and the preformed shank joined to the shank-carrying length.

Although not shown, the shank-carrying and cutting lengths may be provided with one or more straight flutes, the flute or flutes being shallower in the shank-carrying length than in the cutting length and the flute or flutes in said shank-carrying length being of a cross section having the medially disposed convex surface 31 depicted in FIG. 2.

If desired, the transverse inlet port 35 in the shank 28 may be omitted and lubricant fed into the lubricant-conveying passage 33 of the shank at the outer extremity thereof.

Referring now to FIG. 4, this shows a drill of the type known in the trade as a gun drill in which the cutting length 40 is very short and of the conventional straight fluted construction used in gun drills and to which a single tubular shank-carrying length 41 is joined, the bore of which constitutes the lubricant-conveying passage 42 therein, said shank-carrying length having one helical flute 43 with the medial convex surface 44 in similar manner to the drill shown in FIGS. 1, 2 and 3, said lubricant-conveying passage 42 communicating with a straight lubricant-conveying passage 45 in the cutting length 40 at one side the axis thereof by means of a cross port 46 provided at the junction of the two lengths.

In this construction of gun drill the tubular shank 47 being of greater diameter than the shank-carrying length 41 is preformed and suitably joined thereto.

If desired, the shank-carrying lengths 27 and 41 may consist of two or more pieces joined together instead of being a single piece.

The feature that a flute in the shank-carrying length of a drill according to this invention has a cross section providing a convex surface medially of its width and is shallower in depth than the flute into which it merges in the cutting length of the drill provides a drill of greater strength than fluted drills of conventional construction.

A drill constructed according to this invention also provides for economy in the manufacture thereof in that shank-carrying lengths can be cut from steel tubing, of which various sizes in diameter can be kept in stock for the purpose, and joined to preformed cutting lengths, and the tubular shank-carrying lengths then acted upon to provide the necessary flute or flutes therein so as to merge into the flute or flutes of the preformed cutting lengths and the required cross ports provided for intercommunicating the lubricant-conveying passages in the cutting and shank-carrying lengths.

What I claim is:

1. A fluted drill comprising a cutting length and a tubular shank-carrying length rigidly joined together in coaxial relation, the cutting length being provided, at its free extremity, with the cutting end of the drill and, interiorly throughout its length and alongside its axis, with a lubricant-conveying passage, and the tubular shank-carrying length being provided at its free end with a shank, the bore of said shank-carrying length and a bore in the shank together forming a lubricant-conveying passage at the common axis of the shank-carrying length and the shank, a lubricant-conveying cross port being provided in the drill at the junction of the cutting length with the shank-carrying length for intercommunicating the lubricant-conveying passages in said lengths, a flute being provided in each of said lengths of which the flute in the shank-carrying length is of shallower depth than and merges at one end into the adjoining end of the flute in the cutting length and the flute in the shank-carrying length being of a cross section having a convex surface medially of its width which convex surface is constituted by an exposed surface of the integral hollow core of said shank-carrying length, the said exposed surface of said core resulting from the presence of the flute in said shank-carrying length.

2. A fluted drill as claimed in claim 1, characterised in that the shank-carrying length and the shank thereon are formed from a single length of tubing.

3. A fluted drill as claimed in claim 1, characterised in that the shank-carrying length and the shank thereon are formed from separate lengths of tubing.

4. A fluted drill according to claim 1, wherein said flutes provided in the cutting and shank-carrying lengths are helical and the flute in the shank-carrying length is greater in width than the adjoining end of the flute in the cutting length.

5. A fluted drill according to claim 4, wherein said shank-carrying length has an intermediate length of reduced cross section and a lubricant inlet port thereat extending transversely thereof and communicating with the lubricant-conveying passage in the shank and the end of said passage at the extremity of said shank being closed.

6. A fluted drill according to claim 1, wherein said flute in the shank-carrying length is helical and said flute in the cutting length is straight and merges at one end into an adjoining end of the helical flute, said helical flute being of a cross section having a convex surface medially of its width and the straight flute being of V section.

No references cited.